INVENTOR.
Henry F. Johnstone

Patented Apr. 20, 1954

2,676,090

UNITED STATES PATENT OFFICE 2,676,090

RECOVERY OF SULFUR DIOXIDE
CONTAINED IN WASTE GASES

Henry F. Johnstone, Urbana, Ill., assignor to
Texas Gulf Sulphur Company, New York, N. Y.,
a corporation of Texas Application January 26, 1953, Serial No. 333,039

15 Claims. (Cl. 23—178)

This invention relates to the recovery of sulfur dioxide from gases and relates especially to the recovery of sulfur dioxide from waste gases such as those resulting from the combustion of sulfur containing coal or from the roasting or sintering of sulfur-containing materials as in ore refining processes.

The recovery of sulfur dioxide from waste gases is commercially important not only from the standpoint of minimizing pollution problems but also from the standpoint of conservation of sulfur resources. At the present time there is a prevailing shortage of sulfur resulting from increased demand and diminishing resources of brimstone in the United States. On the other hand, it has been estimated that the amount of sulfur as sulfur dioxide which is emitted to the atmosphere in waste combustion gases exceeds the total quantity of sulfur consumed. It is apparent, therefore, that the sulfur dioxide contained in such waste gases offers a potential source of sulfur whose utilization is a matter of great commercial significance provided that recovery of the sulfur in a useful form may be accomplished by methods and equipment such that the cost for thereby producing a sulfur-containing product of sulfur-containing products is competitive with or less than the cost of producing such product or products from other sources of sulfur. The nature of the sulfur-containing product or products produced is also a significant factor not only from the standpoint of the inherent commercial value of the product or products in question but also from the standpoint of availability of markets therefor without entailing unduly high shipping costs.

The sulfur dioxide contained in waste gases from power plants exceeds that in all other forms of waste gases, but in the waste gases from power plants the sulfur dioxide content is relatively low, the proportion being dependent principally upon the sulfur content of the coal consumed. An increasing percentage of the coal consumed in power plants contains more than 4% sulfur and using current combustion methods the stack gases from the combustion of such coal contains about 0.4% by volume of sulfur dioxide or a somewhat higher percentage. One of the objects of this invention is, therefore, to provide an improved process whereby sulfur dioxide can be successfully recovered in a practical and economically feasible manner from such waste gases or even from waste gases containing a substantially lesser content of sulfur dioxide such as 0.1% or 0.2% by volume. However, the process of this invention likewise is of utility in the recovery of sulfur dioxide from waste gases which contain higher proportions of sulfur dioxide such as those containing about 0.7% to about 0.8% by volume of sulfur dioxide which are produced in a lead sintering operation or those containing about 5% to about 6% by volume of sulfur dioxide produced in a zinc roasting operation. More generally, any waste combustion gases containing a substantial proportion of sulfur dioxide provide a potential source for the recovery of sulfur dioxide therefrom according to this invention.

Of the possible absorbents which may be utilized for the absorption of sulfur dioxide from waste gases, ammoniacal solutions have certain distinct advantages due to the fact that, because of the high order of solubility of the ammonium compounds produced by absorption of sulfur dioxide, the ammoniacal solution may be used in such concentrations as to have a large capacity for absorbing sulfur dioxide from the waste gases. When sulfur dioxide is absorbed by an ammoniacal solution sulfur dioxide may react with the ammonia contained in the solution to form ammonium sulfite or ammonium bisulfite and ordinarily the result of the absorption is to produce both ammonium sulfite and ammonium bisulfite, the relative proportions thereof being dependent on such factors as the concentration of the ammonia in the ammoniacal solution which is available for reaction with sulfur dioxide, the concentration of the sulfur dioxide in the waste gases that are contacted with the ammoniacal solution, the temperature at which the absorption is carried out and the extent to which equilibrium conditions are approached in carrying out the absorption. For convenience in reference herein and in the claims the term "ammonium sulfite compound" is used generally as applicable to ammonium sulfite, to ammonium bisulfite and to ammonium sulfite-bisulfite mixtures.

The relative proportion of ammonium sulfite and of ammonium bisulfite in a solution of ammonium sulfite compound produced by the reaction of sulfur dioxide in waste gases with ammonia in an ammoniacal solution contacted therewith may be expressed in terms of the ratio of concentration of the available ammonia, i. e., ammonia available for reaction with the sulfur dioxide, to the concentration of the sulfur dioxide, each of those concentrations being in terms of mols per 100 mols of water. The concentration of the available amonia in terms of mols of ammonia per 100 mols of water is designated herein as $C_a$ and is to be distinguished from the concentration of the total ammonia which, as expressed in terms of mols per 100 mols of water, is designated herein as $C_t$. Under the conditions prevailing during oxidation of sulfur dioxide by an ammoniacal solution some of the sulfur dioxide becomes oxidized to sulfur trioxide which in the aqueous medium becomes converted to sulfuric acid that in turn reacts with ammonia in the ammoniacal solution to produce ammonium sulfate, and to the extent that part of the ammonia in the ammoniacal solution becomes converted to ammonium sulfate, such quantity of the total ammonia ($C_t$) is rendered unavailable for forming a solution of ammonium sulfite compound from which sulfur dioxide may be regenerated in a concentrated usable form. To the extent that ammonium sulfate is so produced there is a recovery of sulfur dioxide from the original stack gases in the form of ammonium sulfate, which is a product having commercial value. However, as will be explained more fully hereinbelow, one of the objects of this invention is the recovery of sulfur dioxide from waste gases and the regeneration of a high proportion of the so-absorbed sulfur dioxide for the production of sulfur dioxide as an end product in a concentrated and usable form.

The concentration of the sulfur dioxide in terms of mols of sulfur dioxide per 100 mols of water that is absorbed by the ammoniacal solution by its reaction with ammonia to form ammonium sulfite compound, as distinguished from ammonium sulfate, is designated herein as $S$. If ammonium sulfite compound is in the form of ammonium sulfite, $(NH_4)_2SO_3$, it is apparent that there are two mols of ammonia per mol of absorbed sulfur dioxide and in such case the value of the ratio $S/C_a$ is 5. On the other hand for ammonium bisulfite, $NH_4HSO_3$, the value of the ratio $S/C_a$ is 1. Ordinarily, under the conditions for the absorption of sulfur dioxide from waste gases by contacting the waste gases with an ammoniacal solution, the proportion of ammonium sulfite to ammonium bisulfite preferably is such that the value of the ratio of $S/C_a$ is in the neighborhood of about .7 to about .9 or even somewhat higher, depending on the concentration of the sulfur dioxide in the waste gases, on the concentration of the ammonia in the solution, and on the temperature of the solution.

If sulfuric acid is added to a solution of ammonium sulfite compound that results from the absorption of sulfur dioxide contained in waste gases by an ammoniacal solution, the sulfuric acid reacts with the ammonium sulfite compound to produce ammonium sulfate and sulfur dioxide and the sulfur dioxide can be readily liberated from the resulting solution of amonium sulfate. After the sulfur dioxide has been separated from the ammonium sulfate solution, the ammonium sulfate may be produced in crystalline form by evaporating water from the solution, as for example, in an evaporator-crystallizer wherein the evaporation of the water is accelerated by heating the solution. If the solution is of sufficient concentration of ammonium sulfate, this compound may be recovered by simply cooling without evaporation of water. The ammonium sulfate thus produced includes that which results from reacting the ammonium sulfite compound with the added sulfuric acid together with such ammonium sulfate as is produced because of oxidation of some of the sulfur dioxide in the waste gases during absorption by the ammoniacal solution. It is apparent that in such an operation all of the ammonia introduced into the system is contained in the recovered ammonium sulfate.

While the recovery of the sulfur dioxide from a solution comprising ammonium sulfite compound may be accomplished by acidification of the solution with sulfuric acid there are certain disadvantages incident to an operation of this type. Due to the large consumption of ammonia and its ultimate conversion to ammonium sulfate it is apparent that an operation of this type is commercially feasible only if the ammonia used is obtainable at a relatively low cost and if the ammonium sulfate can be disposed of on a competitive basis as regards current market price and shipping cost. Moreover, the amount of sulfur dioxide which can be recovered as such is relatively low in relation to the amount of ammonia consumed and the amount of ammonium sulfate which necessarily is produced. Thus, in a typical operation of this type about 3 moles of ammonia are consumed in the operation in order that about 2 mols of sulfur dioxide may be liberated by acidification with sulfuric acid. Moreover, approximately 2 mols of sulfuric acid are required in order to react with the ammonium sulfite compound to produce about 3 mols of sulfur dioxide. Since the sulfuric acid used in the system in order to liberate the sulfur dioxide ordinarily is produced in a sulfuric acid plant from the sulfur dioxide formed by reaction of the sulfuric acid with ammonium sulfite compound it is apparent that for each 3 mols of sulfur dioxide resulting from the acidification of ammonium sulfite compound with sulfuric acid about 2 mols of the sulfur dioxide so released are reintroduced into the system by conversion to the sulfuric acid employed in the acidifiction step. It is also apparent that the cost of the sulfuric acid plant and the conversion of sulfur dioxide to sulfuric acid therein is a substantial item in the overall economy of the system. When one takes into consideration the proportion of the sulfur dioxide liberated by acidification which is converted to sulfuric acid for use in the acidification step the residual proportion of sulfur dioxide which is recoverable as such from the system will only be about 1 mol for each 2 mols of ammonium sulfate produced. This is a disadvantage if a relatively high yield of sulfur dioxide is desired.

Sulfur dioxide can also be recovered from a solution of ammonium sulfite compound obtained by absorbing sulfur dioxide contained in waste gases by means of an ammoniacal solution by a stripping operation utilizing heat which has the effect of raising the vapor pressure of the sulfur dioxide in the solution so that it may be separated from the solution along with water vapor which is also separated from the solution as the result of the increase in the vapor pressure of the water at the elevated temperature appropriate for stripping. Such stripping is ordinarily referred to as steam stripping due to the presence of the water vapor that is released along with the sulfur dioxide. In such steam stripping the solution may be heated by any suitable means such as steam. Ordinarily if steam is used to heat the solution it is directed into out-of-contact heat exchange relation with the solution so that the solution may be heated wtihout unduly diluting the solution and without unduly increasing the amount of water vapor which is released from the solution along with the sulfur dioxide. However, heating by direct contact with steam could be used.

At ordinary absorption temperatures the vapor pressure of the ammonia in the ammoniacal solution is relatively low. However, when the solution is heated to stripping temperature the vapor pressure of the ammonia is also increased. In order to effect the stripping of the sulfur dioxide from the solution it is necessary that, during the stripping operation, the vapor pressure of sulfur dioxide be greater than the vapor pressure of ammonia. The vapor pressure of the sulfur dioxide in relation to that of the ammonia is dependent upon the concentration of the sulfur dioxide in the solution in relation to the ammonia, and the concentration of the sulfur dioxide in the solution is fixed by the concentration of the sulfur dioxide in the waste gases and the temperature at which the sulfur dioxide is absorbed from the waste gases by the ammoniacal solution. In the case of relatively dilute gases this places a limitation on the amount of sulfur dioxide which may be absorbed in the ammoniacal solution in relation to the ammonia. In any case, the maximum amount of sulfur dioxide that is recoverable by stripping is the difference between the concentration of the sulfur dioxide in the solution that may be obtained in equilibrium with the waste gases at the absorption temperature and the concentration of the sulfur dioxide in the solution at which its vapor pressure is just greater than that of the ammonia in the solution when the solution is at the stripping temperature. It is seen, therefore, that there is a severe limitation on the amount of sulfur dioxide that can be separated from a solution of ammonium sulfite compound by resort to the heating of the solution from the absorption temperature to the stripping temperature. Moreover, for simple steam stripping the minimum ratio of steam to sulfur dioxide that is separated from the solution at the stripping temperature cannot be less than the molar ratio of water vapor to sulfur dioxide at the wet bulb temperature of the original gases and if the solution comes approximately to equilibrium with the water vapor and sulfur dioxide in the original gases the ratio of the vapor pressures of the water and of the sulfur dioxide remains approximately constant as the temperature is raised. Thus, the heat requirement for effecting stripping not only is that required to heat the solution from absorption temperature to stripping temperature, but also that which is required for separating a necessarily relatively large proportion of water vapor from the solution along with the sulfur dioxide. The result is that the requirements for heat in effecting a simple stripping operation are so high as to offset to the extent of impracticality the value of the sulfur dioxide which may be recovered in this way. Moreover, in the recovery of sulfur dioxide by steam stripping there is a tendency for the amount of ammonium sulfate formed in the solution as the result of oxidation of sulfur dioxide during the scrubbing of the waste gases to build up with consequent lowering of the capacity of the ammoniacal solution for effectively absorbing sulfur dioxide and some special means for counteracting this tendency has to be resorted to.

According to this invention the difficulties and disadvantages above mentioned which are incident to the recovery of sulfur dioxide from a solution of ammonium sulfite compound produced by absorption of sulfur dioxide contained in waste gases by means of an ammoniacal solution have been overcome by combining in a single operation both acidification with sulfuric acid and steam stripping. By the combined processing steps above mentioned it is possible to greatly reduce the supply of both ammonia and sulfuric acid into the system as a whole as compared with acidification alone and it is also possible to greatly reduce the amount of heat required as compared with steam stripping alone. Moreover, it is possible to obtain a higher yield of sulfur dioxide in relation to ammonium sulfate as compared with the acidification process and substantial flexibility is afforded as between the relative amounts of sulfur dioxide and ammonium sulfate which are produced so that the practice of this invention may be varied according to the relative values of the sulfur dioxide recovered and the ammonium sulfate recovered depending on such factors as the current market values of these products and the location of the plant in relation to available markets therefor. Moreover, it is possible to control and hold at a low value the amount of ammonium sulfate contained in the scrubbing solution during absorption of the sulfur dioxide from the waste gases.

According to this invention a portion of the ammonium sulfite compound which is comprised in the effluent solution obtained by absorbing sulfur dioxide contained in waste gases by means of an ammoniacal solution is caused to react with sulfuric acid to form ammonium sulfate and sulfur dioxide by the addition of sulfuric acid to effluent solution containing the portion of the ammonium sulfite compound which is reacted with the acid. The sulfur dioxide so produced is separated from the residual solution containing the ammonium sulfate, and it is collected and recovered. The ammonium sulfate contained in the residual solution may be recovered as by causing it to crystallize therefrom and then collecting and recovering the ammonium sulfate crystals. From a second portion of the ammonium sulfite compound contained in the effluent solution sulfur dioxide is stripped by heating effluent solution containing the second portion of the ammonium sulfite compound thereby separating sulfur dioxide from residual ammoniacal solution. The sulfur dioxide which is thus produced by stripping is separated and collected and the residual ammoniacal solution from which the sulfur dioxide has been stripped is recycled so as to be comprised in the ammoniacal solution directed into contact with the waste gases.

Preferably in the absorption of the sulfur dioxide contained in the waste gases by ammoniacal solution the ammoniacal solution is directed into contact with the waste gases in at least two zones through which the gases are sequentially passed from a first zone to a second zone and the concentration of the ammonia in the ammoniacal solution that is available for reaction with the sulfur dioxide in the gases is maintained so as to be substantially different in the different zones with decrease in the concentration of the available ammonia in the direction of the sequential travel of the waste gases through the zones so that the concentration of the ammonia contained in the first zone is substantially greater than the concentration of the ammonia contained in the ammoniacal solution in the second zone. In such case in the practice of this invention residual ammoniacal solution which results from having stripped sulfur dioxide and water vapor therefrom during the stripping step above described is recycled so as to be comprised predominantly in ammoniacal solution that is directed into contact with the waste gases in the first zone. During the stripping operation both water vapor and sulfur dioxide are evolved and the sulfur dioxide is separated from the water vapor by condensing the water vapor. Also comprised in the water vapor and sulfur dioxide which are separated during the stripping operation is a small amount of ammonia which reacts with a corresponding small proportion of the sulfur dioxide during the condensation of the water vapor to form a small amount of ammonium bisulfite in the condensed water vapor. The bulk of the sulfur dioxide is separable from the condensate and can be recovered for use in acid manufacture or for any other suitable purpose. The resulting condensate containing a small amount of ammonium bisulfite may then be recycled so as to be comprised predominantly in the ammoniacal solution which is directed into contact with the waste gases in the above mentioned second zone wherein a lesser concentration of available ammonia is maintained as compared with the first zone.

The practice of this invention may be varied as regards the point in the system at which a portion of the ammonium sulfite compound contained in the effluent solution from the scrubber is acidified with sulfuric acid in relation to the stripping of sulfur dioxide from another portion of the ammonium sulfite compound comprised in the effluent solution by steam stripping. Thus, the effluent solution may be divided into two portions, one of which is regenerated by steam stripping and the other of which is acidified with sulfuric acid for the recovery of sulfur dioxide and ammonium sulfate. In such case it is ordinarily preferable to subject the major portion of the effluent from the scrubbing operation to steam stripping.

Alternatively, the effluent solution may be divided into two portions to one of which a portion of the total amount of the sulfuric acid that is used in the overall operation is added prior to steam stripping. To the other portion of the effluent solution there is separately added the balance of the sulfuric acid and the system is so controlled that the amount of ammonium sulfate produced in any period of time by oxidation of the sulfite, by absorption of sulfuric acid vapor from waste gases, and by the addition of sulfuric acid to the first portion of the effluent solution prior to stripping is removed in the same period of time in the second portion to which the balance of the sulfuric acid is added for liberating sulfur dioxide and producing additional ammonium sulfate. In this modification of the process the addition of sulfuric acid to the portion of the effluent solution which is stripped has the effect of greatly increasing the vapor pressure of the sulfur dioxide so as to facilitate the separation of the sulfur dioxide by stripping and thus reduce the amount of heat required for effecting the stripping operation.

According to a third modification of this invention the entire effluent from the scrubbing operation is acidified with an amount of sulfuric acid which is sufficient to react with only a portion of the ammonium sulfite compound contained in the solution and the acidified solution is then passed to the stripper wherein the sulfur dioxide is stripped from the ammonium sulfite compound which remains after the partial acidification of the total ammonium sulfite compound contained in the solution by sulfuric acid. Thus, while the effluent solution is sequentially treated as a whole first by acidification and then by subjecting it to stripping, the operation is similar to the other two modifications of this invention hereinabove referred to in that it involves the reacting of a first portion of the ammonium sulfite compound contained in the effluent solution with sulfuric acid and the stripping of sulfur dioxide from a second portion of the ammonium sulfite compound comprised in the effluent solution. After the solution has been both acidified and subjected to steam stripping the residual ammoniacal solution containing ammonium sulfate can be treated for the separation of ammonium sulfate therefrom merely by cooling the solution so as to cause crystallization of the ammonium sulfate. Upon removing the crystallized ammonium sulfate from the solution the residual ammoniacal solution is recycled so as to be comprised in the ammoniacal solution which is directed into contact with the waste gases. According to this modification the effect of adding all the sulfuric acid prior to stripping is such as to greatly increase the vapor pressure of the sulfur dioxide and thereby facilitate its release so that the heat requirements are still less than in the case of the other modifications above mentioned.

So as to afford a better understanding of this invention certain examples of the practice thereof are described hereinbelow for illustrative purposes in connection with the accompanying drawings wherein.

Figure 1:
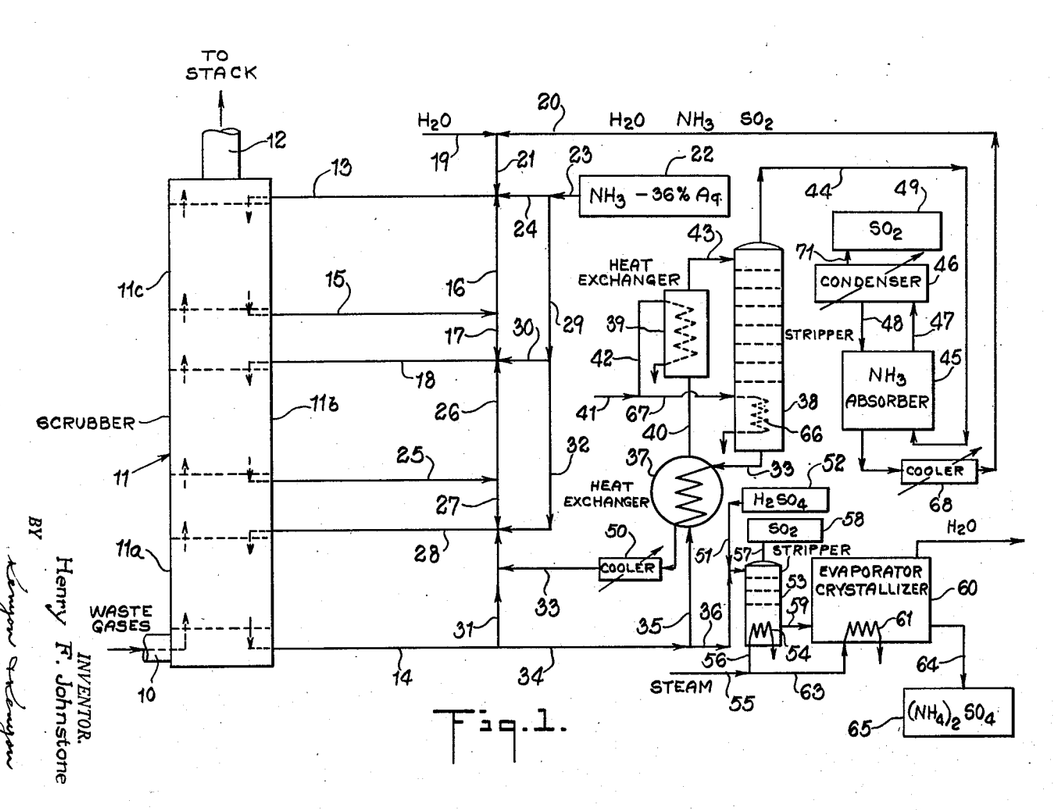
Fig. 1 is a flow sheet illustrating the practice of this invention wherein the effluent from the scrubber is separated into two portions, one of which is subjected to steam stripping and the other of which is subjected to acidification.
Figure 2:
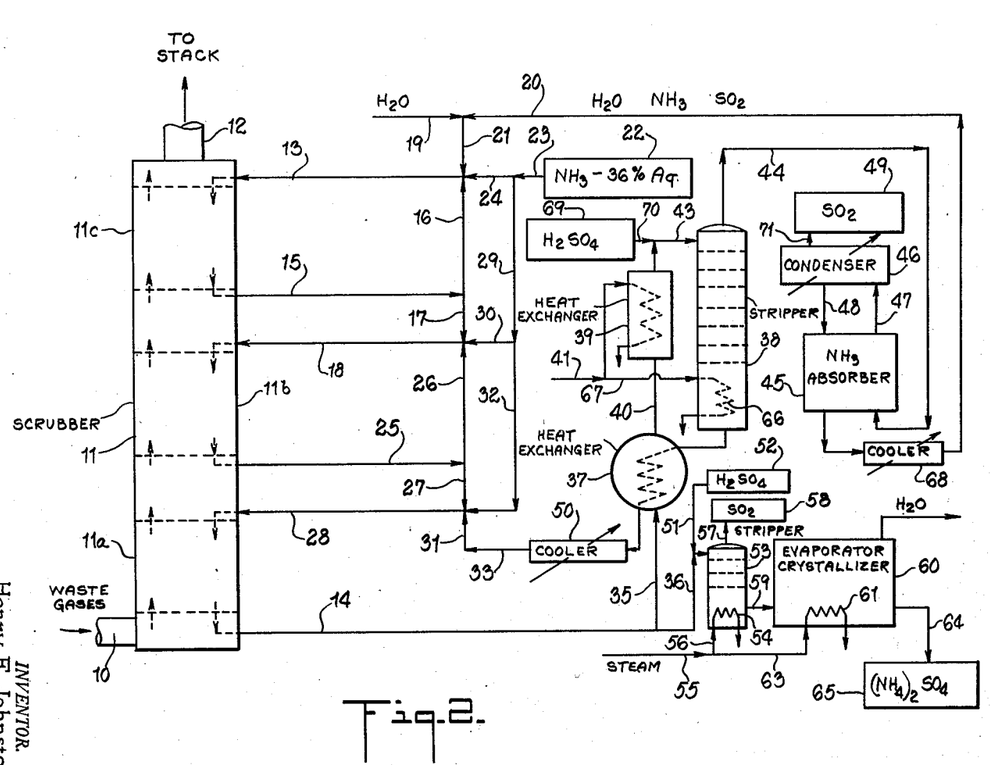
Fig. 2 is a flow sheet illustrating the practice of this invention wherein the effluent from the scrubber is divided into two portions, one of which is subjected to both acidification and steam stripping and the other of which is subjected to acidification.
Figure 3:
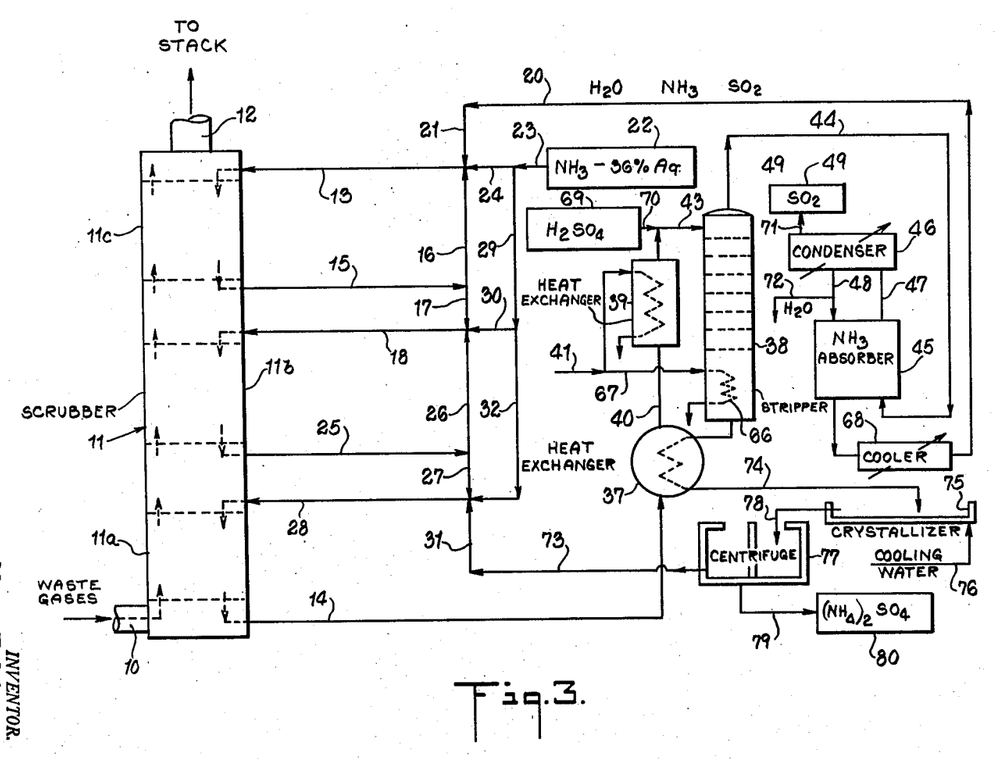
Fig. 3 is a flow sheet illustrating the practice of this invention wherein the entire effluent from the scrubber is subjected sequentially to acidification and to steam stripping.

For purposes of illustration and comparison the operations described hereinbelow in connection with Figs. 1, 2 and 3 are with reference to the recovery of sulfur dioxide from waste combustion gases which have been subjected to cooling and rehumidification so that the wet bulb temperature is about 90° F. The gases contain 0.44% of sulfur dioxide by volume and contain 0.03 pounds of water per pound of dry gas.

Referring to Fig. 1 the waste gases are introduced by the gas conduit 10 into the scrubber which is indicated generally by the reference character 11 and from the top of which they are passed by the gas line 12 to a stack for discharge to the atmosphere. Preferably, as aforesaid, the waste gases are brought into contact with ammoniacal solution in a plurality of zones. For purposes of illustration the scrubber 11 has been shown as comprising the three zones 11a, 11b and 11c. The waste gases pass sequentially through the zones 11a, 11b and 11c. Each zone of the scrubber is such as to provide intimate contact between the waste gases and ammoniacal solution which is caused to flow through the respective zones. Any suitable construction may be employed for providing intimate contact between the gases and the ammoniacal solution in the respective zones of the scrubber. For example, each of the zones may be of the grid-packed tower construction whereby the ammoniacal solution is caused to come in intimate contact with the waste gases and in counterflow thereto in each zone of the scrubber. In each zone of the scrubber the liquid rate of the ammoniacal solution in relation to the flow of waste gases therethrough may, for example, be three gallons per 1,000 cubic feet of gas. However, for better indicating the molar relationships of the interacting chemical substances the following description of illustrative examples of the practice of this invention is in terms of mols and in terms of concentrations expressed as mols per 100 mols of water, the mol quantities stated below indicating flow quantities in terms of mols per unit of time.

The waste gases which enter the scrubber by the gas line 10 are such as to introduce into the system 190 mols of inert gas, 9.5 mols of water in the form of water vapor and 0.88 mol of sulfur dioxide. The system is designed so as to absorb 80% of the sulfur dioxide from the gases with the result that 0.176 mol of sulfur dioxide is passed from the scrubber 11 by the gas line 12. The gases leaving through the line 12 contain the same amount of inert gas and water vapor as the entering gases, namely, 190 mols of inert gas and 9.5 mols of water vapor. According to the present example the system is such that 50% of the sulfur dioxide contained in the entering gases is absorbed in zone 11a of the scrubber while 25% and 5% of the sulfur dioxide contained in the entering gases are absorbed in zones 11b and 11c respectively. This differential absorption of sulfur dioxide in the different zones is afforded by causing the concentration of the available ammonia in the ammoniacal solution to be different in the different zones of the scrubber, such concentration of the ammonia being greatest in zone 11a and least in zone 11c, while an intermediate concentration of the available ammonia is maintained in zone 11b, as will be more particularly described hereinbelow. The term "available" ammonia as used herein refers to the ammonium ions in the ammoniacal solution which are available to form ammonium sulfite or ammonium bisulfite by reaction with sulfur dioxide in the waste gases. The available ammonia includes the ammonium ions which are combined with sulfur dioxide in the form of ammonium sulfite or ammonium bisulfite but does not include ammonium ions which have become inactive as the result of the formation of ammonium sulfite or possibly some other salt or salts other than ammonium sulfite or bisulfite. As mentioned above the symbol $C_a$ indicates the concentration of the available ammonia in terms of mols per 100 mols of water. The symbol $C_t$ refers to the total ammonia including both the available ammonia and any ammonia that has become unavailable as the result of having become combined in the form of ammonium sulfate, for example.

In each of the zones of the scrubber 11 the ammoniacal solution is caused to be circulated therethrough so that in the entering solution and in the leaving solution there will be 100 mols of water relative to the mols of the constituents of the waste gases in contact therewith in the different zones. Accordingly the concentrations below mentioned, which are in terms of mols per 100 mols of water, indicate the content in mols of the constituents of these solutions as well as the flow quantities in terms of mols per unit of time. Considering scrubber 11 as a whole, the concentration of available ammonia ($C_a$) in the solution entering zone 11c by line 13 is 2.2 mols per 100 mols of water, the total ammonia ($C_t$) being 2.62 mols per 100 mols water. The sulfur dioxide content of the ammoniacal solution in the form of ammonium sulfite compound is indicated herein as S, and as the ammoniacal solution enters the zone 11c in contact with the waste gases in this zone the sulfur dioxide content (S) is 2.06 mols per 100 mols water, thus establishing the value of the ratio $S/C_a$ as .937. The sulfate content (which is indicated by (A)) is .21 mol per 100 mols of water. In the effluent line 14 the concentration of available ammonia ($C_a$) is 18.27 mols per 100 mols water, the total ammonia ($C_t$) is 25.35 mols per 100 mols water, the sulfur dioxide (S) is 16.26 mols per 100 mols water, the value of the ratio $S/C_a$ is .89, and the sulfate (A) is 3.54 mols per 100 mols water.

In each of the zones of the scrubber 11 the bulk of the ammoniacal solution is recirculated. Thus, with reference to zone 11c, 90.9% of the effluent taken therefrom by the line 15 is directed by the line 16 for reentry in zone 11c through the line 13 and 9.1% of the effluent is directed into the zone 11b of the scrubber by the lines 17 and 18. To make up for the 9.1% of solution directed from zone 11c to zone 11b, 1 mol of water is fed into the system by the line 19 and mixed with 8 mols of water returned to the scrubber by the line 20 from the regenerator portion of the system to be described hereinbelow, the resulting mixture being directed by the line 21 for entry into zone 11c by line 13. This solution returned to the scrubber by the line 20 contains .166 mol of sulfur dioxide and .166 mol of ammonia. .45 mol of ammonia is fed into the system from the ammonia supply source 22 by the line 23, and since the ammonia is comprised in a 36% by weight aqueous ammonia solution, .8 mol of water is also fed into the system from this source. 16% of the aqueous ammonia that is fed into the system from the source 22 is directed by the line 24 so as to be commingled with the solution entering the zone 11c.

90.5% of the solution leaving zone 11b by the effluent line 25 is returned to this zone by lines 26 and 18, and 9.5% of this effluent is directed to the zone 11a by the lines 27 and 28. 55% of the aqueous ammonia from the aqueous ammonia supply source 22 is also caused to enter zone 11b by the lines 23, 29, 30 and 18.

60% of the solution leaving the zone 11a by the effluent line 14 is returned thereto by the lines 31 and 28, and 29% of the aqueous ammonia from the aqueous ammonia supply source 22 is also directed into the zone 11a by the lines 23, 29, 32 and 28. The balance of the solution entering the zone 11a is supplied thereto by the line 33 which feeds ammoniacal solution into the line 31 from the regenerator portion of the system to be described below. The ammoniacal solution fed into the zone 11a by the lines 33, 31 and 28 supplies 30.2 mols of water and the constituents and the concentrations thereof contained in this solution will be given hereinbelow.

While the waste gases enter the scrubber 11 at about 90° F., the conditions of the reaction are such that the temperatures prevailing in the zones 11a, 11b and 11c are 100° F., 93° F. and 91° F., respectively. The vapor pressure in millimeters of mercury of the sulfur dioxide in the gases as they enter the scrubber 11 by the gas line 10 is 3.34 mm. The vapor pressure of the sulfur dioxide contained in the gases is 1.67 mm. as they leave zone 11a, 0.835 mm. as they leave zone 11b, and is .668 mm. as they leave zone 11c. The value of the partial pressure of sulfur dioxide for equilibrium with the ammoniacal solution in each of the zones 11a, 11b and 11c is substantially below that of the sulfur dioxide in the waste gases in each of the zones so that absorption of sulfur dioxide takes place readily in each of the zones. The value of the partial pressure of ammonia for equilibrium with the ammoniacal solution which enters zone 11c, in contact with the leaving gases is only about .001 mm., so that ammonia losses to the stack gases are slight, namely, about 0.001 mol.

40% of the solution leaving the scrubber 11 by the line 14, is directed from the scrubber portion of the system by the line 34 for recovery of sulfur dioxide therefrom. The solution contained in the line 34 is split into two portions. One portion constituting 38.2% of the solution leaving the scrubber by effluent line 14 is directed by the line 35 for regeneration by stripping sulfur dioxide therefrom. The balance of the solution constituting 1.8% of the solution leaving the scrubber by the line 14 is directed by the line 36 for acidification with sulfuric acid and resultant liberation of sulfur dioxide and formation of ammonium sulfate.

The portion of the solution contained in line 35 is first partially heated in the heat exchanger 37 in out-of-contact heat exchange relation with residual solution which is directed from the stripper 38 by the aforesaid line 33 which feeds this residual solution back into line 31 and thence into zone 11a of the scrubber by line 28. The partially heated solution is directed from the heat exchanger 37 to the heat exchanger 39 by the line 40 to be further heated as with steam supplied by lines 41 and 42 in out-of-contact heat exchange relation with the solution in the heat exchanger 39. The heated solution is then directed by the line 43 to the stripper 38 wherein the desired stripping temperature of about 230° F. is maintained as by the steam coil 66 to which steam is fed by the lines 41 and 67. The stripper 38 is maintained at atmospheric pressure.

8 mols of water in the form of vapor are directed from the stripper 38 by the line 44 and carried therewith is the stripped sulfur dioxide, namely, 0.518 mol, along with a small amount of ammonia, namely, 0.166 mol. This vaporous mixture is taken by the line 44 to the ammonia absorber 45 with which the condenser 46 is connected by the vapor and condensate lines 47 and 48, respectively. In the ammonia absorber 45 the .166 mol of ammonia immediately reacts with a corresponding molar quantity of sulfur dioxide to form ammonium bisulfite, and the 8 mols of water condensate carrying the .166 mol of sulfur dioxide and .166 mol of ammonia are recycled, as aforesaid, by the line 20 so as to be comprised in the ammoniacal solution entering zone 11c of the scrubber preferably after having passed through the cooler 68 in the line 20 for the purpose of cooling the condensate.

The sulfur dioxide separated from the water vapor in the condenser 46, namely, 0.352 mol, is taken from the condenser 46 by the line 48 and is collected and recovered in concentrated form by any suitable means as indicated by the reference character 49.

As the result of the separation of water vapor, along with the stripped sulfur dioxide and a small amount of ammonia from the solution entering the stripper 38, residual ammoniacal solution is produced which, as aforesaid, is returned by the line 33 so as to be comprised in the ammoniacal solution directed into contact with the waste gases in zone 11a of the scrubber. The line 33 may contain the heat exhanger 37 and the cooler 50, although the cooler 50 may be omitted. In this residual solution the ammonia will have become concentrated so that the concentration therein of the available ammonia ($C_a$) is 22.9 mols per 100 mols of water. The concentration of sulfur dioxide in this solution (S) is 19.1 mols per 100 mols of water, the concentration of sulfate (A) is 4.54 mols per 100 mols of water, and the value of the ratio $S/C_a$ is .834.

In the scrubber 11 about 9% of sulfur dioxide recovered from the waste gases, namely, about .063 mol, becomes oxidized to sulfur dioxide which in the presence of the aqueous ammonia becomes converted to ammonium sulfate. Under the conditions above described the sulfate content is, as aforesaid, 3.54 mols per 100 mols of water in the solution leaving the scrubber 11 by the line 14, and such being the case by taking off 1.8% of this effluent solution through the line 36 the ammonium sulfate so formed is removed from the system at the rate that it is produced. The sulfur dioxide comprised in the portion of the effluent solution carried in the line 36, whose concentration is 16.26 mols per 100 mols of water, is released therefrom by mixing with the solution 0.162 mol of sulfuric acid which is added through line 51 from the sulfuric acid supply 52 and which reacts with the ammonium sulfite compound comprised in the solution to form sulfur dioxide and ammonium sulfate. Separation of the sulfur dioxide from the solution is promoted by heating the solution in the stripper 53 as by means of the steam coil 54 to which steam is fed by the lines 55 and 56. The separated sulfur dioxide is taken from the stripper 53 by the line 57 to suitable collecting and recovering means which is indicated by the reference character 58. The sulfur dioxide so recovered is 0.289 mol.

The residual ammonium sulfate solution is taken from the stripper 53 by the line 59 to the evaporator-crystallizer 60 wherein evaporation of water is assisted as by the steam coil 61 to which steam is fed by the lines 55 and 63. In the evaporator-crystallizer 60 1.8 mols of water are removed, this being the amount of water fed into the system by the line 19 (1 mol) and from the ammonia supply source 22 by the line 23 (0.8 mol). The crystallized ammonium sulfate, 0.225 mol, may be removed from the evaporator-crystallizer by any suitable means as indicated by the line 64 to a recovery vessel or the like that is indicated at 65.

In the foregoing operation, of the sulfur dioxide recovered by absorption from the waste gases (80% of the sulfur dioxide content of the waste gases), 9% becomes converted to sulfate, 50% is released by the stripping step, and 41% is released by the acidification step. The sulfuric acid required, considering the system as a whole, is 25 mols per 100 mols of sulfur dioxide produced which is substantially less than half the amount of the sulfuric acid which would be required if 91% of the recovered sulfur dioxide were to have been released by sulfuric acid acidification alone. The amount of ammonium sulfate produced is 0.66 ton per ton of sulfur dioxide recovered from the waste gases, which amount is less than half the amount of ammonium sulfate that would be produced if the 91% of the recovered sulfur dioxide were to have been released solely by acidification with sulfuric acid. As a corollary it is also seen that the requirement of the foregoing system for supply of fresh ammonia thereto is less than half of the requirement for supply of fresh ammonia if the recovered sulfur dioxide were to have been released solely by acidification with sulfuric acid. The loss of ammonia to the stack gases is only 0.2 pound per ton of sulfur dioxide recovered.

The proportion of the recovered sulfur dioxide that is obtained as sulfur dioxide instead of as ammonium sulfate likewise is much higher as compared with release of the sulfur dioxide solely by acidification with sulfuric acid. Moreover, because of the much reduced requirements for sulfuric acid supply to the system the expense for providing and maintaining a sulfuric acid plant whereby the supply of sulfuric acid may be maintained is correspondingly reduced.

The steam required for supplying heat to the system is relatively low as compared with regeneration of the scrubber effluent solely by steam stripping. Thus, in terms of pounds of steam required per pound of sulfur dioxide recovered the steam requirements are 0.33 pound for the preheater 39, 3.8 pounds for the stripper 38 and 0.75 pound for the evaporator-crystallizer 60, the total being 4.88 pounds. This results from the fact that 41% of the sulfur dioxide recovered from the waste gases is liberated by acidification and that it is necessary to liberate only 50% of the sulfur dioxide by steam stripping and in so doing to heat to the stripping temperature only 38.2% of the effluent leaving the scrubber 11 by the effluent line 14. Moreover, as compared with regeneration of the effluent from the scrubber solely by steam stripping, the system above described solves the problem of preventing build up of ammonium sulfate as the result of oxidation of sulfur dioxide in the scrubber and the recovery of the ammonium sulfate so produced in crystallized form is accomplished in an economical way. Under ordinary conditions it is desirable to remove about 2% by volume of the effluent leaving the scrubber by the line 14 to accomplish this purpose and to treat this portion of the effluent with sulfuric acid as has been described above, the objective being that the proportion of the scrubber effluent which is treated with sulfuric acid shall be such that its rate of withdrawal from the system shall be at least sufficient to carry with it the amount of sulfate that is formed or absorbed in the other portions of the system per unit of time. However, if a higher yield of ammonium sulfate is desired, or if the amount of sulfate that is formed or absorbed in other portions of the system is larger than that above exemplified, a larger proportion of the effluent can be so removed and acidified with sulfuric acid to form ammonium sulfate and sulfur dioxide by reaction with the ammonium sulfite compound comprised therein. Alternatively if the amount of sulfate that is formed or absorbed in other portions of the system is less than that above exemplified the proportion of scrubber effluent that is acidified with sulfuric acid may be substantially less.

According to the practice of this invention as illustrated and described hereinbelow in connection with Fig. 2, the operation is in general like that illustrated and described hereinabove in connection with Fig. 1 and utilizes essentially the same elements of equipment. Accordingly the elements of equipment shown in Fig. 2 which correspond to those shown in Fig. 1 have been indicated by the same reference characters and their description will not be repeated. The principal difference between the system of Fig. 1 and that of Fig. 2 is that in Fig. 2 the portion of the effluent solution from the scrubber 11 which is subjected to stripping is partially acidified with sulfuric acid before it enters the stripper 38. The sulfuric acid used for this purpose is supplied from the source 69 by the line 70 so that it becomes commingled with the solution in the line 43 before the solution enters the stripper 38. While the amount of sulfuric acid introduced from the source 69 is sufficient to react with only a portion of the ammonium sulfite compound in the solution that enters the stripper 38, its addition acts to greatly increase the partial pressure of the sulfur dioxide comprised in the solution whereby its separation by stripping may be more readily accomplished with the result that the system illustrated in Fig. 2 involves substantially less requirements for heat supplied as compared with the system above described in connection with Fig. 1 while maintaining essentially the same requirements respecting the amounts of ammonia and total sulfuric acid supplied to the system and the amounts of sulfur dioxide and ammonium sulfate produced. Thus, for purposes of comparison the system shown in Fig. 2 is exemplified below in connection with the recovery of sulfur dioxide from waste gases which as they enter the scrubber 11 are of the same composition and at the same temperature as stated hereinabove in connection with the system of Fig. 1, namely, 190 mols inert gas, 9.5 mols water, 0.88 mol sulfur dioxide, at a temperature of 90° F. Also, as in connection with the system exemplified in connection with Fig. 1, the exit gases leaving the scrubber 11 by the gas line 12 contain 190 mols inert gas, 9.4 mols water, 0.176 mol of sulfur dioxide, and 0.001 mol of ammonia. Of the 80% of the sulfur dioxide recovered from the entering gases 50% is absorbed in zone 11a of the scrubber, 25% is absorbed in zone 11b and 5% is absorbed in zone 11c. The vapor pressures of the sulfur dioxide in the waste gases at the several points with reference to the scrubber are also the same as hereinabove mentioned in connection with Fig. 1. The temperatures maintained in the zones 11a, 11b and 11c are likewise substantially the same.

According to the example described hereinabove in connection with Fig. 2, 0.45 mol of ammonia is supplied to the system in the form of a 36% aqueous ammoniacal solution and the total amount of sulfuric acid introduced into the system is 0.162 mol. Since the amount of sulfur dioxide which is oxidized so as to produce ammonium sulfate in the scrubber is also the same, namely, 9% of the sulfur dioxide recovered, it also follows that the amount of ammonium sulfate recovered from the system also is the same as that in connection with the example described with reference to Fig. 1, namely, 0.225 mol. In connection with the system exemplified in connection with Fig. 2 the percentage of sulfur dioxide which is released solely by reaction of a separated portion of the effluent with sulfuric acid is less, namely, 30%, while a larger percentage of the recovered sulfur dioxide, namely, 61%, is released during the stripping step.

While there are the foregoing similarities between the systems as exemplified in connection with Figs. 1 and 2 respectively, nevertheless, there are differences as regards the details of the operation which are occasioned primarily from the fact that the addition of a portion of the sulfuric acid to the portion of the solution which is subjected to stripping results in such increase in the partial pressure of the sulfur dioxide that the required stripping is accomplished with incidental separation from the solution subjected to stripping of a decreased amount of water as water vapor. By thus raising the partial pressure of the sulfur dioxide, higher concentration of ammonium sulfate may be employed and decreased concentration of available ammonia, whereby a higher equilibrium vapor pressure of the solution leaving the scrubber is permitted and resultant decreased heat requirements for effecting stripping are afforded. The introduction of some of the sulfuric acid into the system that is subjected to stripping also requires the acidification of a somewhat larger separated portion of the effluent from the scrubber so as to prevent excessive build up of ammonium sulfate in proportion of the effluent solution which is regenerated by stripping sulfur dioxide therefrom.

With further reference to the process exemplified in connection with Fig. 2 the concentration of available ammonia ($C_a$) in the solution entering zone 11c of the scrubber by the line 13 is 0.85 mol per 100 mols of water, the total ammonia ($C_t$) being 1.59 mols per 100 mols of water. The sulfur dioxide content (S) of the ammoniacal solution which enters the zone 11c in contact with the waste gases in this zone is 0.76 mol per 100 mols of water. It follows from the foregoing that the ratio of $S/C_a$ is 0.892. 94.6% of the solution leaving zone 11c by the effluent line 15 is recirculated into this zone by the lines 16 and 13 and 5.4% of the solution leaving the zone 11c is directed into the zone 11b by the lines 17 and 18. In order to make up for the 5.4% of the solution leaving the zone 11c which is directed into the zone 11b, 4 mols of water from line 20 are combined with 1.3 mols of water from the line 19, the resultant 5.3 mols of water being fed into the zone 11c by the lines 21 and 13. 15% of the aqueous ammonia fed into the system from the ammonia supply source 22 is also fed into the zone 11c by the lines 23, 24 and 13.

94.2% of the solution leaving the zone 11b by the line 25 is recirculated into the zone 11b by the lines 26 and 18. 55% of the aqueous ammonia fed into the system from the ammonia supply source 22 is also fed into the zone 11b by the lines 23, 29, 30 and 18.

5.8% of the solution leaving the zone 11b is directed into the zone 11a by the lines 27 and 28 and are mixed with 30% of the ammonia supplied to the system from the ammonia supply source 22 by the lines 23, 29 and 32 and with residual ammoniacal solution which is returned to zone 11a of the scrubber from the stripper 38 by the lines 33 and 31 and which supplies 97.9 mols of water containing dissolved ammonium sulfite compound and ammonium sulfate in concentrations which will be mentioned hereinbelow.

Under the foregoing conditions the solution leaving the zone 11a of the scrubber comprises 100 mols of water, as is also the case in connection with the effluents from zones 11b and 11c. In the effluent from zone 11a the concentration of available ammonia ($C_a$) is 10.6 mols per 100 mols of water, the concentration of the total ammonia ($C_t$) is 21.6 mols per 100 mols of water, the concentration of the sulfur dioxide is 10 mols per 100 mols of water, the concentration of sulfate is 5.52 mols per 100 mols of water and the value of the ratio $S/C_a$ is .950.

According to the example with reference to Fig. 2 all of the solution leaving the zone 11a of the scrubber is subjected to treatment for the separation of sulfur dioxide therefrom. 97.9% of the solution leaving the zone 11a of the scrubber by the effluent line 14 is directed to the stripper 38 by the lines 35, 40 and 43 and is heated in the heat exchangers 37 and 39 as hereinabove described in connection with the example of this invention described with reference to Fig. 1. However, before this portion of the solution enters the stripper 38 0.052 mol of sulfuric acid is directed from the sulfuric acid supply source 69 by the line 70 so as to be admixed therewith in the line 43. The temperature and pressure in the stripper are 225° F. and atmospheric respectively, and 0.451 mol of sulfur dioxide is stripped therefrom along with 0.019 mol of ammonia. Due to the acidification of the solution in the stripper 38 the above mentioned amount of sulfur dioxide is carried from the stripper with only 4 mols of water which, as aforesaid, is returned to zone 11c of the scrubber by the line 20 after having been condensed in the condenser 46 which is associated with ammonia absorber 45. The 4 mols of water which are returned by the line 20 carry with it the 0.019 mol of ammonia together with 0.019 mol of sulfur dioxide which is combined therewith as ammonium bisulfite. 0.432 mol of sulfur dioxide is separated from the condensed water and is directed by the line 71 to the collecting means indicated at 49.

The residual ammoniacal solution from the stripper 38 is returned to zone 11a of the scrubber by the line 33 as above mentioned. In this solution the concentration of the available ammonia ($C_a$) is 10.89 mols per 100 mols of water, the concentration of sulfur dioxide (S) is substantially 10 mols per 100 mols of water, the concentration of the sulfate (A) is 5.81 mols per 100 mols of water and the value of the ratio $S/C_a$ is 0.917.

The remaining portion of the effluent solution from the scrubber, namely, 2.1% thereof is treated for the liberation of sulfur dioxide therefrom by reaction with sulfuric acid. 0.11 mol of sulfuric acid is directed from the sulfuric acid source 52 by the line 51 so as to become commingled with the solution in the line 36 prior to introduction of the solution into the stripper 53. 0.209 mol of sulfur dioxide is separated from the solution in the stripper 53 and is directed by the line 57 into suitable means for recovering the sulfur dioxide which is indicated at 58. The above mentioned quantity of solution which is directed to the stripper 53 by the line 36 is sufficient to carry with it such ammonium sulfate as is formed in the rest of the system as the result of oxidation of sulfur dioxide in the scrubber and as the result of the sulfuric acid which is added to the portion of the effluent solution that is directed to the stripper 38. The quantity of ammonium sulfate thus produced together with the additional ammonium sulfate that is produced by the addition of sulfuric acid from the sulfuric acid source 58 to the solution entering the stripper 53 is crystallized in the evaporator-crystallizer 60 with evaporation of 2.1 mols of water therefrom, namely, the same as the amount of water that is supplied to the system by line 19 (1.3 mols) and from the ammonia supply source 22 (0.8 mol). The yield of 0.225 mol of ammonium sulfate may be collected in the collecting means indicated at 65. In this modification of the practice of this invention it is desirable under normal conditions to remove about 2% by volume of the effluent leaving the scrubber by the line 14 in order to prevent an excessive build up of ammonium sulfate in other portions of the system and to treat this portion of the effluent with sulfuric acid as has been described, the objective again being that the proportion of the scrubber effluent which is taken by the line 36 for acidification will be such that its rate of withdrawal from the system shall be at least sufficient to carry with it the amount of sulfate that is formed or absorbed in the other portions of the system per unit of time. However, if a higher yield of ammonium sulfate is desired, or if the amount of sulfate that is formed or absorbed in other portions of the system is larger than that above exemplified, a larger proportion of the effluent can be removed and acidified with sulfuric acid to form ammonium sulfate and sulfur dioxide by reaction with the ammonium sulfite compound comprised therein. Alternatively, if the amount of sulfate that is formed or absorbed in other portions of the system is less than that above exemplified, the proportion of the scrubber effluent that is removed and acidified may be substantially less.

While the total amount of sulfur dioxide and of ammonium sulfate recovered according to the example described in connection with Fig. 2 are the same as in the case of the example described in connection with Fig. 1 and while the requirements for supply of ammonia and sulfuric acid are the same, the system exemplified in connection with Fig. 2 affords economies as regards the amount of heat required as compared with the system exemplified in connection with Fig. 2. Thus, in the case of the latter system, the amount of steam required in terms of pounds per pound of sulfur dioxide recovered is 0.71 pound for the preheater, 1.77 pounds for the stripper 38 and 0.88 pound for the evaporator-crystallizer 60, the total being 3.36 pounds as compared with a total of 4.88 pounds in the case of the example described in connection with Fig. 1.

The practice of this invention is further illustrated by the following example that is described in connection with Fig. 3. This example differs from the examples hereinabove described in connection with Figs. 1 and 2 in that all of the sulfuric acid is added to the effluent from the scrubber prior to stripping and due to this fact still further economies as regards the requirements for heat supply may be afforded. Moreover, according to this further example advantage is taken with the relatively high concentrations which can be afforded in the case of absorption of sulfur dioxide by ammoniacal solution whereby an evaporator-crystallizer is eliminated and the ammonium sulfate produced is recovered solely by cooling the residual ammoniacal solution which results from the stripping step. For purposes of comparison the conditions are otherwise the same as hereinabove exemplified in connection with Figs. 1 and 2. Thus, the temperature and composition of the waste gases entering the scrubber are the same, and the composition of the exit gases from the scrubber is the same. The vapor pressure of the sulfur dioxide contained in the waste gases at the above mentioned points with reference to their travel through the scrubber is likewise the same and the same quantities of sulfur dioxide are absorbed in the different zones of the scrubber and the same proportion of the sulfur dioxide becomes oxidized to sulfate. The temperatures maintained in the zones $11a$, $11b$ and $11c$ likewise are substantially the same. As in the previous examples, the amount of ammonia supplied to the system is .45 mol in the form of a 36% aqueous ammoniacal solution and 0.162 mol of sulfuric acid is supplied. 0.225 mol of ammonium sulfate is recovered.

Insofar as Fig. 3 contains the same elements as those hereinabove described in connection with Figs. 1 and 2 the same reference characters have been applied and a description thereof is not repeated in connection with Fig. 3.

In the system shown in Fig. 3 the concentration of available ammonia ($C_a$) in the ammoniacal solution entering zones $11c$ of the scrubber by the line 13 is 1.14 mols per 100 mols of water, and the concentration of the total ammonia ($C_t$) is 2.34 mols per 100 mols of water. The concentration of sulfur dioxide is 1.04 mols per 100 mols of water, the concentration of sulfate is 0.6 mol per 100 mols of water and the value of the ratio $S/C_a$ is .911. 96.6% of the solution leaving zone $11c$ of the scrubber by the effluent line 15 is recycled to the zone $11c$ by the lines 16 and 13 and 3.4% of the solution leaving zone $11c$ is directed into the zone $11b$ of the scrubber by the lines 17 and 18. 3.3 mols of water from line 20 are fed into the zone $11c$ of the scrubber by the lines 20, 21 and 13 together with 15% of the aqueous ammonia from the aqueous ammonia supply source 22 which is fed into the zone $11c$ of the scrubber by the lines 23, 24 and 13.

96.2% of the solution leaving zone $11b$ of the scrubber by the effluent line 25 is recycled to this zone by the lines 26 and 18 and 57% of the aqueous ammonia from the aqueous ammonia supply source 22 is fed into the zone $11b$ by the lines 23, 29, 30 and 18.

3.8% of the solution leaving the zone $11b$ of the scrubber by the effluent line 25 is directed into the zone $11a$ by lines 27 and 28. 28% of the aqueous ammonia from the aqueous ammonia supply source 22 is also directed into the zone $11a$ by the lines 23, 29, 32 and 28. Residual ammoniacal solution from the regenerator portion of the system is also fed into the zone $11a$ of the scrubber by the lines 73, 31 and 28 and this residual ammoniacal solution contains about 96 mols of water in which are dissolved ammonium sulfite compound and ammonium sulfate whose concentrations will be mentioned hereinbelow.

The solution leaving zone $11a$ of the scrubber by the effluent line 14 contains 100 mols of water as is also the case as regards the effluents from the zones $11b$ and $11c$. In the solution leaving the zone $11a$ the concentration of the available ammonia ($C_a$) is 10.6 mols per 100 mols of water, the concentration of total ammonia ($C_t$) is 21.6 mols per 100 mols of water, the concentration of the sulfur dioxide (S) is substantially 10 mols per 100 mols of water, the concentration of sulfate (A) is 5.52 mols per 100 mols of water and the value of the ratio $S/C_a$ is 0.95.

The entire effluent from the scrubber is directed by the lines 34, 40 and 43 to the stripper 38 and in thus being directed to the stripper 38 it is preheated by the heat exchangers 37 and 39 as hereinabove described. Prior to entry into the stripper 38 the entire amount of the sulfuric acid employed, namely, .162 mol, is directed from the sulfuric acid supply source 69 by the line 70 so as to become commingled with the solution in the line 43 as the solution enters the stripper 38. This amount of sulfuric acid is sufficient to react with only a portion of the ammonium sulfite compound contained in the solution for release of sulfur dioxide and formation of ammonium sulfate. The sulfur dioxide is separated from the solution by steam stripping and such separation is greatly facilitated by the fact that the added sulfuric acid raises the partial pressure of the sulfur dioxide at the stripping temperature which is desirably about 225° F. in the stripper 38, the pressure in the stripper 38 being atmospheric pressure. Under such conditions .654 mol of sulfur dioxide is taken from the stripper 38 by the line 44 along with 4 mols of water as water vapor and 0.013 mol of ammonia. The water vapor is condensed in the condenser 46 with which the ammonia absorber 45 is associated and, since it is only desirable to return 3.3 mols of water to the zone 11c of the scrubber by the line 20, 0.7 mol of water is removed from the system by the line 72. The 3.3 mols of water recycled through the line 20 carries with it 0.013 mol of ammonia combined with 0.013 mol of sulfur dioxide. The balance of the sulfur dioxide, namely, .641 mol, is separated from the condensed water vapor and is directed by the line 71 to the sulfur dioxide recovery means which is indicated at 49.

The residual ammoniacal solution in the stripper 38 contains the ammonium sulfate which results from oxidation of 9% of the sulfur dioxide recovered from the waste gases and ammonium sulfate which results from the addition of the sulfuric acid to the solution entering the stripper. The concentration of ammonium sulfate in the solution is sufficiently high that, on cooling, crystals of the ammonium sulfate will form. This solution is partially cooled in the heat exchanger 37 in the line 74 which directs the residual ammoniacal solution from the stripper 38 to the crystallizer 75 wherein the residual ammoniacal solution is further cooled as by the supply of cooling water through line 76. The slurry of ammonium sulfate which becomes crystallized in the crystallizer 75 together with the mother liquor is passed to the centrifuge 77 by the line 78 from which the crystallized ammonium sulfate is taken by any suitable means indicated by the line 79 to a suitable means for collecting the recovered ammonium sulfate which is indicated at 80. The amount of ammonium sulfate thus recovered, namely .225 mol is that which is produced in the system as the result of oxidation of sulfur dioxide in the scrubber and as the result of the addition of sulfuric acid. The mother liquor from the centrifuge 77 is directed as aforesaid into the zone 11a of the scrubber by the lines 73, 31 and 28. In this recycled ammoniacal solution the concentration of available ammonia ($C_a$) is 10.65 mols per 100 mols of water, the concentration of sulfur dioxide (S) is substantially 9.78 mols per 100 mols of water, the concentration of sulfate (A) is 5.7 mols per 100 mols of water and the value of the ratio $S/C_a$ is 0.917.

In connection with the example of the practice of this invention which has been described in connection with Fig. 3 the entire amount of the sulfur dioxide which is produced, namely, 91% of the sulfur dioxide removed from the waste gases, is separated from the solution in the stripper 38, and the other 9% is oxidized and is withdrawn as ammonium sulfate. However, as in the case of the examples described in connection with Figs. 1 and 2 a portion of the sulfur dioxide so recovered is to be regarded as having been produced by the reaction between ammonium sulfite compound and sulfuric acid with formation of ammonium sulfate and sulfur dioxide and another portion of the sulfur dioxide is to be regarded as recovered by stripping it from the ammoniacal solution along with water vapor.

In order to afford a comparison between the examples of this invention which have been described in connection with Figs. 1, 2 and 3 like conditions have been described with reference to the composition and temperature of the waste gases, the amount of ammonia and sulfuric acid supplied to the system and the amount of recovered sulfur dioxide and ammonium sulfate. Thus, in connection with each example 25 mols of sulfuric acid are required per 100 mols of sulfur dioxide produced and 0.66 ton of ammonium sulfate are produced per ton of sulfur dioxide recovered from the waste gases. Each of the examples of the practice of this invention which have been hereinabove described afford the advantages that have been mentioned hereinabove in connection with the employment of the system described in connection with Fig. 1 as compared with the release of recovered sulfur dioxide solely by acidification with sulfuric acid. As between the methods described in connection with Figs. 1, 2 and 3 that utilizing the system described in connection with Fig. 3 involves the lowest heat requirements. Thus, according to the example described in connection with Fig. 3 no steam is required for an evaporator-crystallizer as is the case respecting the examples described in connection with Figs. 1 and 2. According to the example described in connection with Fig. 3 0.56 pound of steam is required in the preheater per pound of sulfur dioxide recovered and only 1.85 pounds of steam per pound of sulfur dioxide recovered is required in the stripper, the total steam requirements thus being only 2.41 pounds of steam per pound of sulfur dioxide recovered. This amount of steam required may be compared with the total of 4.88 pounds of steam according to the example hereinabove described in connection with Fig. 1 and the total of 3.36 pounds of steam per pound of sulfur dioxide recovered in the case of the example hereinabove described in connection with Fig. 2. While the example of the practice of this invention which has been described in connection with Fig. 3 has the advantage of having the lowest steam requirement, nevertheless, the practice of this invention which has been described in connection with Fig. 3 is somewhat less flexible in that in order to obtain crystallization of ammonium sulfate solely by cooling the residual solution formed in the stripper, it is necessary to maintain relatively high solution concentrations in the effluent which is taken from the scrubber and which is subjected to stripping after acidification with sulfuric acid.

The practice of this invention as illustrated in connection with any of Figs. 1 to 3 has the advantage of flexibility as regards the relative proportions of sulfur dioxide and ammonium sulfate which may be produced in the recovery of sulfur dioxide from waste gases. Each of the examples of the practice of this invention which has been described hereinabove has illustrated the recovery of the sulfur dioxide with an accompanying low rate of production of ammonium sulfate as a by-product. In this way the amounts of ammonia and of sulfuric acid required to be supplied to the system likewise can be minimized. Moreover, the amount of recovered sulfur dioxide which must be converted to sulfuric acid for the purpose of maintaining the supply of sulfuric acid to the system can be held to a low value with resultant lessening of the costs incident to the provision and operation of a sulfuric acid plant as part of the overall system and with resultant increase in the proportion of the recovered sulfur dioxide that does not have to be reused in the system by conversion to sulfuric acid and that can be taken as such from the system. However, depending on such matters as the market value of ammonium sulfate and of sulfur dioxide recovered as such, as well as the availability of markets for such products, each of the systems above described in connection with Figs. 1, 2 and 3 is such that the relative proportions of ammonium sulfate and of sulfur dioxide can be varied by increasing or decreasing the relative proportions of the portions of ammonium sulfite compound contained in the effluent from the scrubber which are subjected to acidification with sulfuric acid to form ammonium sulfate and sulfur dioxide and have sulfur dioxide separated therefrom as the result of stripping.

While the practice of this invention has been described in connection with certain specific examples it is apparent that the practice of this invention may be varied in respects other than those mentioned hereinabove. Thus, in the recovery of sulfur dioxide from waste gases the concentrations of the ammoniacal solution brought into contact with the waste gases may be varied and such variation may be advantageous in the case of waste gases which may be at a different temperature or which may contain different amounts of sulfur dioxide or of water vapor. Moreover, while the absorption of the sulfur dioxide from waste gases has been described in connection with such absorption in three zones wherein the concentration of the available ammonia in the ammoniacal solution is different in each zone the absorption may be caused to take place in a greater or lesser number of zones or even in a single zone. However, it is preferable to carry out the absorption in at least two zones wherein the concentration of the available ammonia in the ammoniacal solution is decreased in the direction of the passage of the waste gases from one zone to the next so as to obtain high concentrations of absorbed sulfur dioxide in the effluent from the scrubber, efficient recovery of the sulfur dioxide and low ammonia losses.

Ordinarily it is preferable to maintain the temperature at which absorption of sulfur dioxide is carried out in the scrubber at as low a temperature as possible inasmuch as under such conditions the capacity of the ammoniacal solution is greater and the scrubbing efficiency is greater particularly as regards accomplishing a good recovery of sulfur dioxide from dilute gases without increasing the losses of ammonia to the stack gases to an objectionable extent. However, waste gases often contain a substantial amount of water vapor resulting from the combustion of hydrogen and from evaporation of water contained in a fuel such as coal, and this is significant, for it is the wet bulb temperature of the waste gases which automatically establishes the temperature of the absorption in the scrubber. For example, the wet bulb temperature is approximately 127° F. for stack gases at 300° F. containing 0.05 pound of water vapor per pound of dry gas. Actually, however, the equilibrium saturation temperature of the scrubbing solution may be slightly higher, e. g., about 10° F. higher, because of the lower vapor pressure of water in equilibrium with a scrubbing solution for relatively high solution concentrations. Accordingly, in order to obtain increased scrubbing efficiency and increased capacity of the scrubbing solution, dehumidification and cooling of the waste gases, as by direct contact with a large volume of water in a precooler, may be justified in some cases, and the foregoing examples of the practice of this invention have been in connection with waste gases thus dehumidified and cooled. However, the gases need not necessarily be dehumidified and percooled in practicing this invention.

The particular conditions maintained in the system may be varied from those described hereinabove in connection with the foregoing description of typical examples of the practice of this invention. Important factors in this regard which affect the conditions desirably maintained are the concentration of the sulfur dioxide in the waste gases and the temperature at which their absorption is effected by contact with the ammoniacal solution. The number of the scrubbing zones is likewise important as regards the conditions maintained in each zone. Ordinarily it is desirable to maintain the capacity of the scrubbing solution relatively high particularly if the concentration of the sulfur dioxide in the waste gases is low and if the temperature of the absorption is relatively high, subject, however, to the desirability of avoiding concentrations which would result in undesirably high ammonia losses to the waste gases. The capacity of the ammoniacal solution also is significant as regards the amount thereof that is recirculated into contact with the waste gases. A further disadvantage in connection with employment of relatively low concentrations in the ammoniacal solution used is that in effecting the recovery of ammonium sulfate by crystallization the evaporation of more water is required. The capacity and degree of absorption of sulfur dioxide in an ammoniacal solution also desirably affects the amount of sulfuric acid required for reaction to form ammonium sulfate and sulfur dioxide, for it is apparent that requirements for sulfuric acid in this regard decrease as the ratio $S/C_a$ increases. The amount of sulfuric acid employed likewise is dependent upon the proportion of ammonium sulfate which is produced by the process as the result of adding sulfuric acid for reaction with ammonium sulfite compound to produce ammonium sulfate and sulfur dioxide. Generally, it is desirable that the proportion of sulfur dioxide which is produced by the reaction of ammonium sulfite compound comprised in effluent from the scrubber with sulfuric acid to form ammonium sulfate and sulfur dioxide be at least about 35% by weight of the total sulfur dioxide obtained by said reaction plus the additional sulfur dioxide separated from ammonium sulfite compound by stripping. However, depending upon the amount of ammonium sulfate which it may be regarded as desirable to produce, the amount of sulfuric acid used, and by like token the amount of ammonium sulfate recovered, may be increased and in such case the proportion of the sulfur dioxide produced by reaction of ammonium sulfite compound with sulfuric acid would be increased in relation to the total sulfur dioxide obtained. However, it is usually preferable that the proportion of sulfur dioxide produced by reaction of ammonium sulfite compound with sulfuric acid be not greater than about 75% by weight of the total sulfur dioxide obtained by reaction with the sulfuric acid plus the additional sulfur dioxide obtained by stripping. These comments are applicable to any of the modifications of this invention which have been described hereinabove.

More generally, particularly as regards the absorption of the sulfur dioxide from the waste gases and the character of the solution obtained as a result of such absorption, the conditions caused to be maintained under the particular circumstances presented should be such that the vapor pressure of the sulfur dioxide in the waste gases be substantially greater than the equilibrium partial pressure of sulfur dioxide in ammoniacal solution in contact with waste gases in the zone or zones wherein such contact is maintained. A low equilibrium partial pressure of ammonia is also desirable as regards minimizing ammonia losses. Depending on the particular circumstances presented, the partial pressures desirably maintained may be derived from the following formulae:

$$P^*_{SO_2} = M\frac{(HSO_3^-)^2}{(SO_3^=)} = M\frac{(2S-C_t)^2}{C_t-S} \quad (1)$$

$$P^*_{NH_3} = N\frac{(NH_4+)(SO_3^=)}{(HSO_3^-)} = N\frac{C_t(C_t-S)}{2S-C_t} \quad (2)$$

$$P^*_{H_2O} = P_w\frac{(H_2O)}{(NH_3)+(SO_2)+(H_2O)} = \frac{100\,P_w}{100+C_t+S} \quad (3)$$

$$\log M = 5.865 - 2369/T \quad (4)$$

$$\log N = 13.680 - 4987/T \quad (5)$$

These equations hold when there is no sulfate or salt other than ammonium sulfite-bisulfite. If sulfate is present in the solution from the absorption of sulfuric acid vapor or oxidation of part of the sulfite, the equations become $$P^*_{SO_2} = M\frac{(2S-C_t+2A)^2}{C_t-S-2A} \quad (6)$$

$$P^*_{NH_3} = N\frac{C_t(C_t-S-2A)}{2S-C_t+2A} \quad (7)$$

The constants M and N are functions of the absolute temperature (°K.) as shown. The equations give the partial pressures in millimeters of mercury and in this equation $P^*$ is the equilibrium partial pressure with the solution, $C_t$ is the total concentration of ammonium ions in the solution in terms of mols per 100 mols of water, S is the concentration of sulfur dioxide in solution in terms of mols per 100 mols of water, A is the concentration of sulfate ions (or other equivalent bivalent ions) in solution in terms of mols per 100 mols of water, and T is absolute temperature, degrees Kelvin.

I claim:

1. A process for the recovery of sulfur dioxide from waste gases wherein aqueous ammoniacal solution is directed into contact with said gases, sulfur dioxide contained in said gases is absorbed by said solution by reaction with ammonia contained therein to form ammonium sulfite compound dissolved in said solution and effluent solution is separated from said gases which comprises the steps of reacting a portion of the ammonium sulfite compound comprised in said effluent solution with sulfuric acid to form ammonium sulfate and sulfur dioxide by adding sulfuric acid to effluent solution containing said portion of said ammonium sulfite compound, separating from the solution sulfur dioxide so formed leaving residual solution containing ammonium sulfate, collecting the separated sulfur dioxide, crystallizing ammonium sulfate from said residual solution, collecting and recovering said crystalized ammonium sulfate, stripping sulfur dioxide from a second portion of said ammonium sulfite compound comprised in said effluent solution by heating effluent solution containing said second portion of said compound to separate sulfur dioxide therefrom leaving residual ammoniacal solution, collecting the so separated sulfur dioxide, and recycling said residual ammoniacal solution so as to be comprised in said ammoniacal solution directed into contact with said waste gases.

2. A process according to claim 1 wherein the proportion of sulfur dioxide produced by reaction of ammonium sulfite compound comprised in the effluent solution with sulfuric acid is a minor proportion by weight of the total sulfur dioxide obtained from said effluent solution by said reaction and by stripping sulfur dioxide from ammonium sulfite compound comprised in said solution.

3. A process according to claim 1 wherein the proportion of sulfur dioxide produced by reaction of ammonium sulfite compound comprised in the effluent solution with sulfuric acid constitutes from about 35% to about 75% by weight of the total sulfur dioxide obtained from said effluent solution by said reaction and by stripping sulfur dioxide from ammonium sulfite compound comprised in said solution.

4. A process for the recovery of sulfur dioxide from waste gases which comprises directing aqueous ammoniacal solution into contact with the waste gases in at least two zones through which the gases are sequentially passed from a first zone to a second zone and in which sulfur dioxide contained in said gases is absorbed by said ammoniacal solution by reaction with ammonia contained therein to form ammonium sulfite compound dissolved in said solution, maintaining the concentration of ammonia contained in said ammoniacal solution and available for said reaction with the sulfur dioxide in said gases substantially different in said zones with substantial decrease in said concentration in the direction of sequential travel of said gases through said zones so that said concentration in said first zone is substantially greater than said concentration in said second zone, separating from said gases effluent solution containing the ammonium sulfite compound formed by the absorption of sulfur dioxide therein from said gases, reacting a portion of the ammonium sulfite compound in said effluent solution with sulfuric acid to form ammonium sulfate and sulfur dioxide by adding sulfuric acid to effluent solution containing said portion of said ammonium sulfite compound, separating from the solution sulfur dioxide so formed leaving residual solution containing ammonium sulfate, crystallizing ammonium sulfate from said residual solution, collecting and recovering said crystallized ammonium sulfate, stripping sulfur dioxide from a second portion of said ammonium sulfite compound comprised in said effluent solution by heating effluent solution containing said second portion of said compound to separate therefrom sulfur dioxide commingled with water vapor leaving residual ammoniacal solution, separating the sulfur dioxide from said water vapor by condensation of said water vapor, collecting the separated sulfur dioxide, recycling condensate resulting from the condensation of said water vapor so as to be comprised predominantly in ammoniacal solution directed into contact with said gases in said second zone, and recycling said residual ammoniacal solution so as to be comprised predominantly in ammoniacal solution directed into contact with said gases in said first zone.

5. A process for the recovery of sulfur dioxide from waste gases wherein aqueous ammoniacal solution is directed into contact with said gases, sulfur dioxide contained in said gases is absorbed by said solution by reaction with ammonia contained therein to form ammonium sulfite compound dissolved in said solution and effluent solution is separated from said gases which comprises the steps of heating a first portion of said effluent solution to separate sulfur dioxide and water vapor therefrom leaving residual ammoniacal solution, recycling said residual ammoniacal solution so as to be comprised in said ammoniacal solution directed into contact with said waste gases, separating sulfur dioxide from said water vapor by condensing said water vapor, collecting said sulfur dioxide, mixing sulfuric acid with a second portion of said effluent solution for reaction with ammonium sulfite compound contained therein to form ammonium sulfate and sulfur dioxide, separating sulfur dioxide so produced from said second portion of the solution leaving residual solution containing ammonium sulfate, and collecting the separated sulfur dioxide.

6. A process according to claim 5 wherein said second portion of said effluent solution to which said sulfuric acid is added is withdrawn from the system at a rate which is at least sufficient to carry with it any amount of sulfate that is formed or absorbed in other portions of the system.

7. A process according to claim 5 wherein the proportion of sulfur dioxide produced by reaction of ammonium sulfite compound comprised in said second portion of said effluent solution with sulfuric acid constitutes from about 35% to about 75% by weight of the total sulfur dioxide obtained from said second portion of said effluent solution by said reaction and obtained by stripping sulfur dioxide from ammonium sulfite compound comprised in said first portion of said effluent solution.

8. A process for the recovery of sulfur dioxide from waste gases which comprises directing aqueous ammoniacal solution into contact with the waste gases in at least two zones through which the gases are sequentially passed from a first zone to a second zone and in which sulfur dioxide contained in said gases is absorbed by said ammoniacal solution by reaction with ammonia contained therein to form ammonium sulfite compound dissolved in said solution, maintaining the concentration of ammonia contained in said ammoniacal solution and available for said reaction with the sulfur dioxide in said gases substantially greater in said zones with substantial decrease in said concentration in the direction of sequential travel of said gases through said zones so that said concentration in said first zone is substantially greater than said concentration in said second zone, separating from said gases effluent solution containing the ammonium sulfite compound formed by absorption of sulfur dioxide from said gases, heating a first portion of said effluent solution to separate sufur dioxide and water vapor therefrom leaving residual ammoniacal solution, recycling said residual ammoniacal solution so as to be comprised predominantly in ammoniacal solution directed into contact with said gases in said first zone, separating the sulfur dioxide so produced from said water vapor by condensing said water vapor, collecting the separated sulfur dioxide, recycling condensate resulting from the condensation of said water vapor so as to be comprised predominantly in ammoniacal solution directed into contact with said gases in said second zone, mixing sulfuric acid with a second portion of said effluent solution which is substantially less by volume than said first portion so as to react with the ammonium sulfite compound contained in said second portion to form ammonium sulfate and sulfur dioxide, separating sulfur dioxide so formed from the solution leaving residual solution containing ammonium sulfate, crystallizing ammonium sulfate from said residual ammonium sulfate-containing solution and collecting and recovering said crystallized ammonium sulfate.

9. A process for the recovery of sulfur dioxide from waste gases wherein aqueous ammoniacal solution is directed into contact with said gases, sulfur dioxide contained in said gases is absorbed by said solution by reaction with ammonia contained therein to form ammonium sulfite compound dissolved in said solution and effluent solution is separated from said gases which comprises the steps of adding sulfuric acid to a first portion of said effluent solution to raise the vapor pressure of sulfur dioxide contained therein by reacting part of the ammonium sulfite compound contained in said first portion of the effluent solution so as to form ammonium sulfate and sulfur dioxide, heating the resultant solution to strip therefrom sulfur dioxide formed by said reaction of ammonium sulfite compound with the said sulfuric acid together with additional sulfur dioxide and water vapor leaving residual ammoniacal solution, recycling said residual ammoniacal solution so as to be comprised in ammoniacal solution directed into contact with said waste gases, separating the sulfur dioxide from the water vapor by condensing the water vapor, collecting the so-separated sulfur dioxide, adding sulfuric acid to a second portion of said effluent solution so as to react with ammonium sulfite compound contained therein to form ammonium sulfate and sulfur dioxide, separating the sulfur dioxide so produced leaving residual ammonium sulfate-containing solution and collecting the separated sulfur dioxide.

10. A process according to claim 9 wherein said second portion of said effluent solution to which said sulfuric acid is added is withdrawn from the system at a rate which is at least sufficient to carry with it any amount of sulfate that is formed or absorbed in other portions of the system per unit of time.

11. A process according to claim 9 wherein the proportion of sulfur dioxide produced by reaction of ammonium sulfite compound contained in said first and second portions of the effluent solution with sulfuric acid constitutes about 35% to about 75% by weight of the total sulfur dioxide obtained by said reaction plus the additional sulfur dioxide separated from said first portion of the effluent solution by stripping sulfur dioxide from said first portion of the effluent solution.

12. A process for the recovery of sulfur dioxide from waste gases which comprises directing aqueous ammoniacal solution into contact with the waste gases in at least two zones through which the gases are sequentially passed from a first zone to a second zone and in which sulfur dioxide contained in said gases is absorbed by said ammoniacal solution by reaction with ammonia contained therein to form ammonium sulfite compound dissolved in said solution, maintaining the concentration of ammonia contained in said ammoniacal solution and available for said reaction with the sulfur dioxide in said gases substantially different in said zones with substantial decrease in said concentration in the direction of sequential travel of said gases through said zones so that the said concentration in said first zone is substantially greater than said concentration in said second zone, separating from said gases effluent solution containing the ammonium sulfite compound formed by the absorption of the sulfur dioxide therein from said gases, adding sulfuric acid to a first portion of said effluent solution so as to increase the vapor pressure of the sulfur dioxide therein by reaction with a part of the ammonium sulfite compound contained in said first portion of said effluent solution, heating the so-acidified first portion of the solution so as to strip therefrom sulfur dioxide resulting from reaction with the added sulfuric acid together with additional sulfur dioxide and water vapor leaving residual ammoniacal solution, separating the stripped sulfur dioxide from the water vapor by condensing the water vapor, collecting the so separated sulfur dioxide, recycling condensate resulting from the condensation of said water vapor so as to be comprised predominantly in the ammoniacal solution directing into contact with said gases in said second zone, recycling said residual ammoniacal solution so as to be comprised predominantly in ammoniacal solution directed into contact with said gases in said first zone, adding sulfuric acid to a second portion of said effluent solution for reaction with the ammonium sulfite compound contained in said second portion of the effluent solution to form ammonium sulfate and sulfur dioxide, separating the so-produced sulfur dioxide from the solution leaving residual solution containing ammonium sulfate, crystallizing ammonium sulfate from said ammonium sulfate-containing residual solution, and collecting and recovering the ammonium sulfate so produced, said second portion of said effluent solution being substantially less than said first portion of said effluent solution and containing an amount of ammonium sulfate which is at least equal to the amount of ammonium sulfate formed by adding sulfuric acid to said first portion of said effluent solution.

13. A process for the recovery of sulfur dioxide from waste gases wherein aqueous ammoniacal solution is directed into contact with said gases, sulfur dioxide contained in said gases is absorbed by said solution by reaction with ammonia contained therein to form ammonium sulfite compound dissolved in said solution and effluent solution is separated from said gases which comprises the steps of adding sulfuric acid to said effluent solution for reaction with part of the ammonium sulfite compound contained therein to form ammonium sulfate and sulfur dioxide, heating the acidified solution so as to strip therefrom sulfur dioxide formed by reaction between the ammonium sulfite compound and the added sulfuric acid together with additional sulfur dioxide and water vapor leaving residual ammoniacal solution containing ammonium sulfate, separating the stripped sulfur dioxide from the water vapor by condensing the water vapor, collecting the sulfur dioxide so produced, cooling the residual ammoniacal solution containing ammonium sulfate to crystallize ammonium sulfate therefrom leaving residual ammoniacal solution, separating the crystallized ammonium sulfate from said residual ammoniacal solution, and recycling the residual ammoniacal solution separated from the crystallized ammonium sulfate so as to be comprised in the ammoniacal solution directed into contact with said waste gases.

14. A process according to claim 13 wherein the proportion of sulfur dioxide produced by reaction of ammonium sulfate compound comprised in the effluent solution with sulfuric acid is about 35% to about 75% by weight of the total sulfur dioxide obtained by said reaction plus the additional sulfur dioxide separated from the effluent solution by stripping sulfur dioxide therefrom.

15. A process for the recovery of sulfur dioxide from waste gases which comprises directing aqueous ammoniacal solution into contact with the waste gases in at least two zones through which the gases are sequentially passed from a first zone to a second zone and in which sulfur dioxide contained in said gases is absorbed by said ammoniacal solution by reaction with ammonia contained therein to form ammonium sulfite compound dissolved in said solution, maintaining the concentration of ammonia contained in said ammoniacal solution and available for said reaction with the sulfur dioxide of said gases substantially different in said gases with a substantial decrease in said concentration in the direction of sequential travel of said gases through said zones so that said concentration in said first zone is substantially greater than said concentration in said second zone, separating from said gases effluent solution containing the ammonium sulfite compound formed by the absorption of sulfur dioxide from said gases, adding to said effluent solution sulfuric acid for reaction with part of the ammonium sulfite compound contained in said effluent solution to form ammonium sulfate and sulfur dioxide, stripping from the acidified solution the sulfur dioxide produced by reaction with the sulfuric acid together with additional sulfur dioxide and water vapor leaving residual ammoniacal solution containing ammonium sulfate, separating the stripped sulfur dioxide from the water vapor by condensing the water vapor, collecting the sulfur dioxide so produced, recycling condensate resulting from the condensation of said water vapor so as to be comprised predominantly in ammoniacal solution directed into contact with said gases into said second zone, cooling the residual ammoniacal solution containing ammonium sulfate so as to cause crystallization of ammonium sulfate therefrom, separating crystallized ammonium sulfate from the ammoniacal solution, and recycling the ammoniacal solution from which the ammonium sulfate crystals have been separated so as to be comprised predominantly in ammoniacal solution directed into contact with said gases in said first zone.

References Cited in the file of this patent

UNITED STATES PATENTS

| Number | Name | Date |
|---|---|---|
| 1,916,980 | Horvitz | July 4, 1933 |
| 2,405,747 | Hixson | Aug. 13, 1946 |
| 2,449,537 | Hixson | Sept. 21, 1948 |

FOREIGN PATENTS

| Number | Country | Date |
|---|---|---|
| 101,738 | Australia | Aug. 12, 1937 |